3,152,970
APPLICATION OF PIGMENT TO ANODIZED ALUMINUM
Darwin P. Jensen, 2565 Palos Verdes Drive,
West Palos Verdes Estates, Calif.
No Drawing. Filed Oct. 3, 1961, Ser. No. 142,478
9 Claims. (Cl. 204—38)

This invention relates to the application of a pigment to oxidized surfaces of aluminum. By the term "aluminum," as used herein, is meant to include aluminum alloys as well as commercially pure aluminum.

This invention relates more particularly to the application of a black, cobalt pigment to anodized alumium.

It is a well established commercial practice to apply colors to anodized aluminum by adsorption of organic dye stuffs. However, such procedure has the disadvantage that organic dyes fade in sunlight.

It is also known to apply an inorganic pigment to an anodized aluminum surface by chemical treatment but oftentimes, and particularly in the case of a black pigment, it is difficult to obtain a uniform color.

For example, it is known to apply a black pigment to anodized aluminum by soaking an aluminum article having an anodized surface in a bath of cobalt acetate, rinsing and then subjecting the article to the action of an aqueous bath of ammonium sulfide. The article is then rinsed and subjected to the action of hot water to seal the anodized aluminum, that is, to make it less porous. However, such practice produces various shades of black from one lot to another, and even in a single lot or on a single metal article.

It is an object of the present invention to provide improvements upon the application of color to aluminum.

It is a more particular object of the invention to provide a means whereby inorganic pigments can be applied to anodized aluminum articles whilst obtaining a greater control over the uniformity of the color.

It is a particular object of the invention to provide an improvement in the application of a black cobalt pigment to anodized aluminum whereby a uniform black color is obtained.

The above and other objects of the invention will be apparent from the ensuing description and the appended claims.

In accordance with my present invention, I provide an aluminum article or articles having an oxide coating of a type which will adsorb or absorb a color material, for example, a dye stuff such as an azo dye, or an inorganic pigment such as the cobalt sulfide pigment hereinafter described.

However, I prefer to employ anodized aluminum, that is to say, aluminum to which an oxide coating has been applied by anodic oxidation. Such anodizing processes are well known and do not require detailed description herein. Thus, it is known to employ a sulfuric acid solution as the electrolyte, or to employ a chromic acid solution or an oxalic acid solution as the electrolyte. The aluminum article is made the anode and current is passed through the bath to form a thin, dense coating of aluminum oxide on the metal. As is well known in the art, it is a common practice to seal such an oxide coating by treatment with hot water, the reason being that oxide coatings formed in this manner tend to be rather porous and it is preferred to render them nonporous.

In accordance with previous practice, it is known to treat anodized aluminum, preferably before the sealing step, with an aqueous solution of a suitable cobalt salt, such as cobalt acetate, then rinse, then treat the metal with an aqueous solution of suitable sulfide such as ammonium sulfide, then rinse and then seal by subjecting the piece to the action of hot water. However, as stated above, such process is defective in that uniformity of color is not achieved.

I have discovered that by incorporating a nitrogen containing control agent in the first treating solution, that is, in the solution of cobalt salt, I am able to achieve a uniform color application.

In carrying out my process the oxide coating, as stated, may be applied by any desired method that will produce an oxide that will absorb the coloring agent, preferably by anodizing. The application of pigment is preferably done before the final sealing step. Various cobalt salts may be used, one of the best being cobaltous acetate. Any other soluble cobalt salt in which the cobalt is in the form of its cation which is soluble in water, may be used. For example, cobalt salts of other carboxylic acids may be used such as cobaltous benzoate, cobaltous propionate, cobaltous formate, cobaltous bromate, cobaltous chlorate, cobaltous chloride, cobaltous fluosilicate, cobaltous nitrate and cobaltous sulfate. Certain of these salts are less desirable than others. For example; the chloride is less desirable because it has a tendency to pit aluminum. However, all soluble cobalt salts may be used which, upon addition of a sulfide, precipitate a black cobalt sulfide.

The aluminum article to be treated is soaked in an aqueous bath of cobalt salt, e.g., 5 to 15 minutes at room temperature sufficient to deposit the cobalt salt in the oxide film. To this bath is added a nitrogen-containing control agent. The preferred control agent is sulfamic acid, but others may be used, for example, glycine, ammonium nitrate, ammonia and triethanolamine.

The quantity of control agent may vary considerably; e.g., it may be present in the amount of 1% or less to 20% or more, preferably about 2 to 15% based on the weight of solution of cobalt salt.

After soaking in this bath, the article is removed and preferably rinsed with water. Then it is soaked, e.g., 1 to 12 minutes at room temperature in an aqueous bath of a soluble sulfide, e.g., ammonium sulfide of 3 to 20% concentration. Then the article is removed and rinsed and the oxide surface is sealed by any suitable means, e.g., by immersing it in hot water.

By this means, a uniform, dark black color is imparted to the surface of the aluminum which is fast, i.e., not subject to fading on exposure to sunlight. The color is uniform from lot to lot.

The following specific example will serve further to illustrate the practice and advantages of my invention:

A sheet of aluminum alloy of the type 6063 was anodized to produce a layer of oxide film about 0.001" thick. The anodizing was carried out in a bath of 15% sulfuric acid by placing the aluminum sheet in the bath, making it the anode and passing current at a density of 15 amperes per square foot for a period of one hour. The aluminum was then rinsed with water and soaked at room temperature (about 70° F.) for 10 minutes in a bath of 15% cobaltous acetate containing 6% sulfamic acid. pH of the bath was about 7.5.

The aluminum sheet was next rinsed, then held 2 minutes at room temperature in a 5% aqueous ammonium sulfide solution. The sheet was then rinsed in water and then subjected to the action of hot water to seal the oxide coating.

By this means a uniform deep black color is imparted to the aluminum which is resistant to fading in sunlight.

By means of a similar procedure, stable, fast, uniform pigment coatings can be applied with other metals than cobalt. For example, by using 15% silver nitrate and 6% sulfamic acid, instead of cobalt acetate-sulfamic acid, and precipitating with 5% ammonium sulfide, a black coating is applied which is stable and uniform.

By using 15% lead acetate–6% sulfamic acid and precipitating with potassium dichromate a yellow coating is applied which is stable and uniform. By using a 15% cupric sulfate–6% sulfamic acid solution and precipitating with potassium ferrocyanide a red coating is applied which is stable and uniform. In the case of lead acetate, distilled or deionized water is used because the hardness of ordinary tap water precipitates insoluble lead salts.

The concentrations of the various reactants (color-forming metal salt and precipitant) and control agents may vary widely. For example, the color-forming salt may be used from a 2% concentration up to saturation, about 10 to 20% being usually preferred.

It will be seen, therefore, that by means of my invention greatly improved pigmentation of anodized aluminum is achieved.

I claim:

1. A process of applying a metal sulfide pigment to anodized aluminum comprising: providing a body of aluminum having an anodized, unsealed surface; subjecting such surface to contact with a first aqueous solution of a soluble salt of a metal cation selected from the group consisting of cobalt, lead, copper and silver cations, said solution containing a nitrogen control agent dissolved therein in an amount not less than about 1 percent and not more than about 20 percent by weight of said solution and being selected from the group consisting of sulfamic acid, glycine, triethanolamine, ammonium nitrate and ammonia, whereby said solution is absorbed on said surface; then subjecting the thus treated surface to contact with a second aqueous solution of a water soluble sulfide to precipitate the respective metal sulfide and to cause absorption thereof by said surface.

2. The method of claim 1 wherein said cation is cobalt.

3. The method of claim 2 wherein said cobalt is present in said first aqueous solution in the form of cobalt acetate and said nitrogen control agent is sulfamic acid.

4. The method of claim 1 wherein said cation is lead.

5. The method of claim 4 wherein the lead in said first aqueous solution is in the form of lead acetate and said nitrogen control agent is sulfamic acid.

6. The method of claim 1 wherein said cation is copper.

7. The method of claim 6 wherein the copper in said first aqueous solution is in the form of copper sulfate and said control agent is sulfamic acid.

8. The method of claim 1 wherein said cation is silver.

9. The method of claim 8 wherein the silver in said first aqueous solution is in the form of silver nitrate and said control agent is sulfamic acid.

References Cited in the file of this patent

UNITED STATES PATENTS

| | | |
|---|---|---|
| 2,018,388 | Tosterud | Oct. 22, 1935 |
| 2,496,649 | Zelley | Feb. 7, 1950 |
| 2,710,804 | Schenk | June 14, 1955 |
| 2,844,496 | Newell | July 22, 1958 |

FOREIGN PATENTS

| | | |
|---|---|---|
| 834,049 | Great Britain | May 4, 1960 |